(12) United States Patent
Stuckey

(10) Patent No.: US 7,769,567 B2
(45) Date of Patent: Aug. 3, 2010

(54) METHOD FOR DESIGNING TIRE NOISE PITCH SEQUENCE

(75) Inventor: Jon Irvin Stuckey, Louisville, OH (US)

(73) Assignee: Bridgestone Americas Tire Operations, LLC

( * ) Notice: Subject to any disclaimer, the term of this patent is extended or adjusted under 35 U.S.C. 154(b) by 1281 days.

(21) Appl. No.: 10/698,318

(22) Filed: Oct. 31, 2003

(65) Prior Publication Data

US 2004/0093106 A1 May 13, 2004

Related U.S. Application Data

(60) Provisional application No. 60/423,094, filed on Nov. 1, 2002.

(51) Int. Cl.
*G06F 17/10* (2006.01)

(52) U.S. Cl. .......................................................... 703/2
(58) Field of Classification Search ...................... 703/2
See application file for complete search history.

(56) References Cited

U.S. PATENT DOCUMENTS

| | | | |
|---|---|---|---|
| 1,956,011 A | 4/1934 | Evans | |
| 2,124,821 A | 7/1938 | Hubach | |
| 2,808,867 A | 10/1957 | Buddenhagen et al. | |
| 2,878,852 A | 3/1959 | Lippmann et al. | |
| 3,023,798 A | 3/1962 | Moore et al. | |
| 3,861,436 A | 1/1975 | Poque | |
| 3,926,238 A | 12/1975 | Vorih | |
| 3,951,191 A | 4/1976 | Suzuki et al. | |
| 3,989,780 A | 11/1976 | Vorih | |
| 3,998,256 A | 12/1976 | Verdier | |
| 4,178,199 A | 12/1979 | Lippman et al. | |
| 4,327,792 A | 5/1982 | Landers | |
| 4,416,316 A | 11/1983 | Clatworthy et al. | |
| 4,442,499 A | 4/1984 | Sekula et al. | |
| 4,474,223 A | 10/1984 | Landers | |
| 4,503,898 A | 3/1985 | Hitzky | |
| 4,721,141 A | 1/1988 | Collette et al. | |
| 4,727,501 A | 2/1988 | Parker et al. | |
| 4,784,200 A | 11/1988 | Fujiwara | |

(Continued)

FOREIGN PATENT DOCUMENTS

EP 0 454 658 10/1991

(Continued)

OTHER PUBLICATIONS

PCT/US03/34768 Search Report, Mar. 10, 2004, Bridgestone/Firestone North American Tire, LLC.

(Continued)

*Primary Examiner*—Paul L Rodriguez
*Assistant Examiner*—Russ Guill
(74) *Attorney, Agent, or Firm*—Thomas R. Kingsbury; Fred Zollinger

(57) ABSTRACT

A method of designing a pitch noise pitch sequence includes the steps of first defining the characteristics of the tire noise generated by tire tread lug stiffness variations and then defining a tire noise pitch sequence that yields the defined characteristics to provide preferred modulation characteristics and good level characteristics. A tire is provided having a pitch sequence designed from this method. The tire has five different pitches with pitch ratios of 1.00, 1.10, 1.25, 1.40, and 1.50.

6 Claims, 13 Drawing Sheets

U.S. PATENT DOCUMENTS

| | | | |
|---|---|---|---|
| 4,785,861 A | 11/1988 | Fujiwara | |
| 4,785,862 A | 11/1988 | Konishi et al. | |
| 4,788,651 A | 11/1988 | Parker et al. | |
| 4,798,236 A | 1/1989 | Fujiwara | |
| 4,823,853 A | 4/1989 | Hitzky | |
| 4,936,364 A | 6/1990 | Kajiwara et al. | |
| 5,027,875 A | 7/1991 | Kogure | |
| 5,062,461 A | 11/1991 | Noguchi | |
| 5,125,444 A | 6/1992 | Yoshida | |
| 5,209,793 A | 5/1993 | Cusimano, II | |
| 5,223,059 A | 6/1993 | Himuro | |
| 5,223,065 A | 6/1993 | Kogure | |
| 5,240,053 A | 8/1993 | Baumhofer et al. | |
| 5,240,054 A | 8/1993 | Kogure | |
| 5,269,357 A | 12/1993 | Killian | |
| 5,295,087 A | 3/1994 | Yoshida et al. | |
| 5,309,965 A | 5/1994 | Williams | |
| 5,314,551 A | 5/1994 | Williams | |
| 5,327,952 A | 7/1994 | Glover et al. | |
| 5,353,855 A | 10/1994 | Kajiwara et al. | |
| 5,358,022 A | 10/1994 | Glover et al. | |
| 5,363,895 A | 11/1994 | Wells et al. | |
| 5,365,987 A | 11/1994 | Ishii et al. | |
| 5,371,685 A | 12/1994 | Bandel et al. | |
| 5,373,882 A | 12/1994 | Nakagawa | |
| 5,383,506 A | 1/1995 | Kogure | |
| 5,394,916 A | 3/1995 | Williams | |
| 5,617,341 A | 4/1997 | Nakajima | |
| 5,658,409 A | 8/1997 | Kakumu | |
| 5,690,760 A | 11/1997 | Brown, Jr. | |
| 5,714,021 A | 2/1998 | Ochi | |
| 5,717,613 A | 2/1998 | Nakajima | |
| 5,733,393 A | 3/1998 | Hubbell et al. | |
| 5,743,974 A | 4/1998 | Wesolowski | |
| 5,746,848 A | 5/1998 | Schulze et al. | |
| 5,753,057 A | 5/1998 | Wesolowski | |
| 5,759,310 A | 6/1998 | Wesolowski | |
| 5,759,311 A | 6/1998 | Williams | |
| 5,759,312 A | 6/1998 | Wesolowski | |
| 5,769,990 A | 6/1998 | Hoffmeister | |
| 5,824,169 A | 10/1998 | Landers et al. | |
| 5,865,921 A | 2/1999 | Zakelj et al. | |
| 5,964,266 A | 10/1999 | Boiocchi et al. | |
| 5,974,872 A | 11/1999 | Morishita et al. | |
| 5,996,660 A | 12/1999 | Kakumu et al. | |
| 6,109,318 A | 8/2000 | Yukawa | |
| 6,112,167 A | 8/2000 | Zakelj | |
| 6,161,431 A | 12/2000 | Drahne et al. | |
| 6,216,757 B1 | 4/2001 | Ohara et al. | |
| 6,311,748 B1 | 11/2001 | Boiocchi et al. | |
| 6,321,180 B1 | 11/2001 | Hubbell, Jr. | |
| 6,363,984 B1 | 4/2002 | Morgan | |
| 6,409,861 B1 | 6/2002 | Yukawa | |
| 6,439,285 B1 | 8/2002 | Elkurd et al. | |
| 6,450,223 B1 | 9/2002 | Landers et al. | |
| 6,514,366 B1 | 2/2003 | Xie | |
| 6,531,012 B2 | 3/2003 | Ishiyama | |
| 2003/0040886 A1* | 2/2003 | Stuckey | 702/183 |

FOREIGN PATENT DOCUMENTS

| | | |
|---|---|---|
| EP | 0 528 577 | 2/1993 |
| EP | 0528577 A | 2/1993 |
| EP | 0 645 264 | 9/1994 |
| EP | 0 691 219 | 1/1996 |
| EP | 0 743 200 | 11/1996 |
| EP | 0 846 576 | 6/1998 |
| EP | 0846576 A | 6/1998 |
| JP | 1-178005 | 7/1989 |
| JP | 4-123907 | 4/1992 |
| JP | 20000142029 | 5/2000 |
| WO | 9709184 A | 3/1997 |
| WO | WO 97/09184 | 3/1997 |

OTHER PUBLICATIONS

Honeywell Saicor Signals, "Correlation and Probability Analysis" Dr. I.M. Langenthal, Apro. 1970.

"The Hilbert Transform and Application to Correlation Measurements" by J. R. Underbrink, ACS 516, Dec. 1992.

"Tyre Noise Simulation at Computer" by F.N. Mambretti dated 1988, pp. 175-182.

Brian G. Ferguson and Barry G. Quinn; Application of the short-time Fourier transform and the Wigner-Ville distribution to the acoustic localization of aircraft; Aug. 1994; pp. 821-827.

R.C. Mellin and G. Sovran; Controlling the Tonal Characteristics of the Aerodynamic Noise Generated by Fan Rotors; Mar. 1970; pp. 143-154.

John J. Benedetto and Michael W. Frazier, Wavelets: Mathematics and Applications; published at least Sep. 27, 1993, pp. 2-13.

Thomas A. Williams, Tire Tread Pattern Noise reduction Through the Application of Pitch Sequencing, published at least by October 29, 2000, pp. 955-959.

Peschel, Wolfgang, European Search Report from corresponding European Application 09012481.9, Dec. 9, 2009, 8 pages, European Patent Office, Munich, Germany.

* cited by examiner

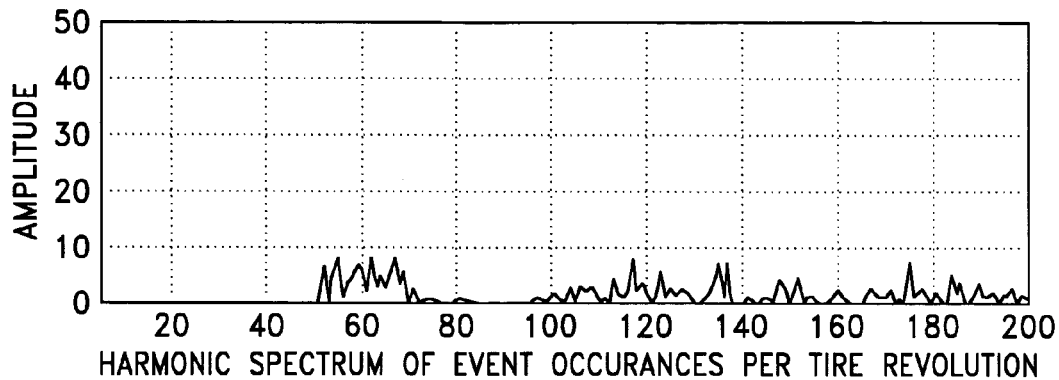
FIG-1A
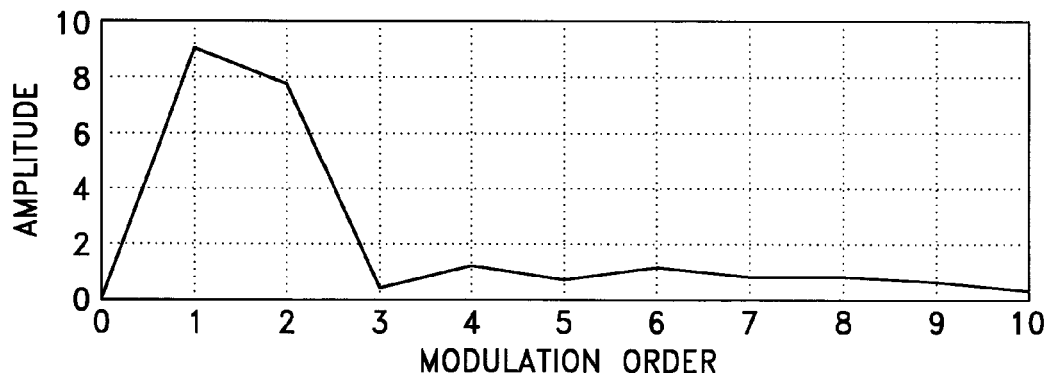
FIG-1B
60GB2 - 12131233131333223332231212111311122112313222213
233321121232 → 8 : 10 : 12
FIG-1C

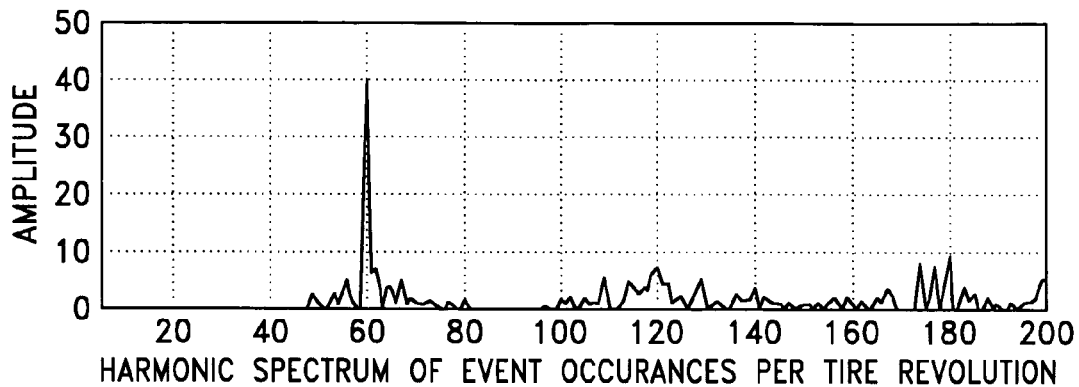
FIG-2A
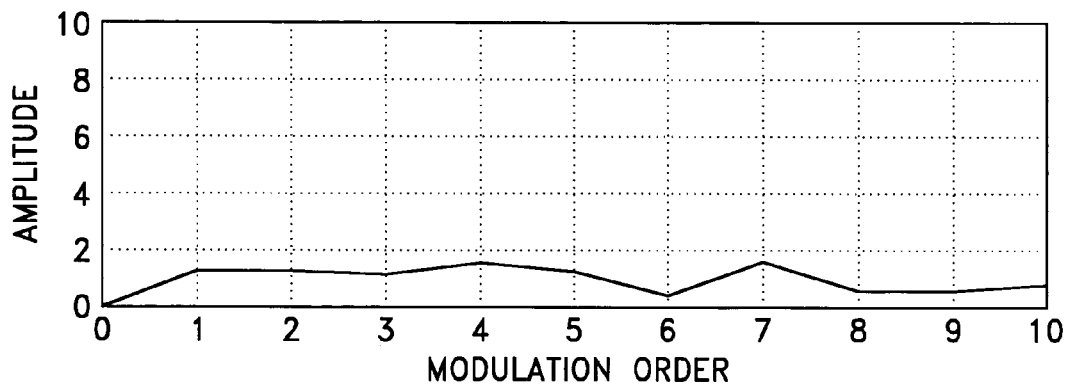
FIG-2B
```
60BG3 -  1321322311131223332211333112132132221231313112
332222211323 → 8 : 10 : 12
```
FIG-2C

FIG 12A

| | 53 | 54 | 55 | 56 | 57 | 58 | 59 | 60 | 61 | 62 | 63 | 64 | 65 | 66 | 67 |
|---|---|---|---|---|---|---|---|---|---|---|---|---|---|---|---|
| 1 | 3 | 2 | 3 | 4 | 4 | 3 | 2 | 3 | 4 | 4 | 4 | 4 | 2 | 4 | 3 |
| 2 | 2 | 2 | 2 | 3 | 3 | 2 | 1 | 1 | 3 | 3 | 3 | 3 | 1 | 3 | 3 |
| 3 | 1 | 3 | 2 | 2 | 2 | 2 | 1 | 1 | 2 | 3 | 3 | 3 | 1 | 3 | 3 |
| 4 | 1 | 4 | 1 | 2 | 1 | 3 | 1 | 1 | 2 | 2 | 2 | 2 | 2 | 2 | 2 |
| 5 | 1 | 4 | 2 | 1 | 1 | 3 | 2 | 2 | 1 | 2 | 2 | 2 | 3 | 2 | 2 |
| 6 | 2 | 3 | 2 | 1 | 1 | 4 | 3 | 3 | 1 | 1 | 1 | 1 | 3 | 1 | 2 |
| 7 | 3 | 2 | 3 | 2 | 2 | 4 | 4 | 4 | 2 | 1 | 1 | 1 | 4 | 2 | 1 |
| 8 | 3 | 1 | 3 | 3 | 3 | 3 | 4 | 4 | 2 | 2 | 2 | 2 | 4 | 2 | 2 |
| 9 | 4 | 1 | 3 | 3 | 4 | 2 | 3 | 4 | 3 | 2 | 2 | 2 | 3 | 2 | 2 |
| 10 | 4 | 2 | 4 | 4 | 5 | 2 | 3 | 3 | 4 | 3 | 3 | 3 | 3 | 3 | 3 |
| 11 | 4 | 3 | 4 | 5 | 5 | 1 | 2 | 2 | 5 | 4 | 3 | 4 | 2 | 4 | 4 |
| 12 | 3 | 4 | 4 | 5 | 5 | 2 | 2 | 2 | 5 | 5 | 4 | 5 | 2 | 4 | 4 |
| 13 | 3 | 5 | 4 | 5 | 5 | 3 | 2 | 2 | 5 | 5 | 5 | 5 | 3 | 5 | 5 |
| 14 | 3 | 4 | 3 | 4 | 4 | 4 | 3 | 3 | 5 | 5 | 5 | 5 | 3 | 5 | 5 |
| 15 | 3 | 3 | 3 | 2 | 2 | 5 | 3 | 3 | 4 | 5 | 5 | 5 | 4 | 5 | 5 |
| 16 | 2 | 2 | 2 | 1 | 1 | 4 | 4 | 4 | 3 | 3 | 4 | 4 | 5 | 4 | 4 |
| 17 | 3 | 2 | 2 | 1 | 1 | 4 | 4 | 4 | 2 | 2 | 3 | 2 | 5 | 3 | 3 |
| 18 | 3 | 3 | 3 | 1 | 1 | 3 | 4 | 4 | 1 | 1 | 1 | 1 | 4 | 2 | 2 |
| 19 | 4 | 3 | 3 | 2 | 2 | 2 | 4 | 4 | 1 | 1 | 1 | 1 | 3 | 1 | 1 |
| 20 | 4 | 4 | 4 | 4 | 4 | 2 | 3 | 3 | 1 | 1 | 1 | 1 | 1 | 1 | 1 |
| 21 | 3 | 4 | 4 | 5 | 5 | 3 | 3 | 3 | 3 | 2 | 1 | 2 | 1 | 1 | 1 |
| 22 | 2 | 3 | 3 | 5 | 5 | 3 | 3 | 3 | 4 | 3 | 3 | 3 | 1 | 2 | 2 |
| 23 | 1 | 2 | 2 | 4 | 5 | 4 | 2 | 3 | 5 | 4 | 4 | 4 | 1 | 3 | 3 |
| 24 | 1 | 1 | 1 | 3 | 3 | 4 | 2 | 2 | 5 | 5 | 5 | 5 | 3 | 4 | 4 |
| 25 | 1 | 1 | 1 | 2 | 2 | 3 | 1 | 2 | 4 | 4 | 5 | 5 | 4 | 5 | 5 |
| 26 | 3 | 1 | 1 | 2 | 1 | 3 | 1 | 1 | 3 | 4 | 4 | 4 | 5 | 5 | 5 |
| 27 | 4 | 2 | 3 | 2 | 2 | 2 | 2 | 1 | 2 | 3 | 3 | 3 | 5 | 4 | 4 |
| 28 | 5 | 4 | 4 | 3 | 2 | 1 | 2 | 2 | 2 | 2 | 2 | 2 | 5 | 3 | 3 |
| 29 | 5 | 5 | 5 | 3 | 3 | 1 | 3 | 3 | 2 | 2 | 2 | 2 | 4 | 2 | 2 |
| 30 | 4 | 5 | 5 | 4 | 4 | 2 | 4 | 3 | 2 | 2 | 2 | 2 | 3 | 2 | 2 |
| 31 | 2 | 5 | 4 | 3 | 4 | 3 | 5 | 4 | 3 | 3 | 2 | 2 | 2 | 2 | 2 |
| 32 | 1 | 4 | 3 | 3 | 3 | 4 | 4 | 4 | 4 | 3 | 3 | 3 | 1 | 2 | 2 |
| 33 | 1 | 3 | 1 | 2 | 3 | 4 | 4 | 4 | 4 | 4 | 3 | 3 | 1 | 3 | 3 |
| 34 | 1 | 3 | 1 | 2 | 2 | 5 | 3 | 4 | 3 | 3 | 4 | 4 | 1 | 3 | 3 |
| 35 | 3 | 2 | 1 | 3 | 3 | 5 | 3 | 3 | 3 | 3 | 3 | 3 | 2 | 4 | 4 |
| 36 | 4 | 1 | 2 | 4 | 3 | 4 | 2 | 3 | 2 | 2 | 3 | 3 | 3 | 4 | 3 |
| 37 | 4 | 1 | 3 | 5 | 4 | 4 | 2 | 2 | 2 | 2 | 2 | 3 | 3 | 3 | 3 |
| 38 | 4 | 2 | 4 | 5 | 5 | 3 | 3 | 2 | 3 | 2 | 2 | 2 | 4 | 3 | 3 |
| 39 | 3 | 2 | 5 | 4 | 5 | 2 | 3 | 3 | 4 | 3 | 2 | 2 | 5 | 2 | 2 |
| 40 | 2 | 3 | 4 | 3 | 4 | 1 | 3 | 3 | 5 | 4 | 3 | 3 | 5 | 2 | 2 |

FIG 12B

|    | 53 | 54 | 55 | 56 | 57 | 58 | 59 | 60 | 61 | 62 | 63 | 64 | 65 | 66 | 67 |
|----|----|----|----|----|----|----|----|----|----|----|----|----|----|----|----|
| 41 | 2  | 5  | 3  | 1  | 2  | 1  | 2  | 3  | 5  | 5  | 4  | 4  | 5  | 3  | 3  |
| 42 | 2  | 5  | 2  | 1  | 1  | 1  | 2  | 3  | 5  | 5  | 5  | 5  | 4  | 3  | 3  |
| 43 | 3  | 5  | 2  | 1  | 1  | 1  | 2  | 2  | 4  | 4  | 5  | 5  | 4  | 4  | 4  |
| 44 | 3  | 4  | 2  | 2  | 2  | 3  | 2  | 2  | 2  | 3  | 4  | 4  | 3  | 5  | 5  |
| 45 | 3  | 2  | 3  | 3  | 3  | 4  | 3  | 3  | 1  | 2  | 3  | 3  | 2  | 5  | 5  |
| 46 | 2  | 1  | 3  | 4  | 4  | 5  | 4  | 3  | 1  | 1  | 2  | 2  | 2  | 4  | 4  |
| 47 | 2  | 1  | 3  | 4  | 4  | 5  | 4  | 4  | 1  | 1  | 1  | 1  | 1  | 3  | 3  |
| 48 | 2  | 2  | 2  | 4  | 4  | 5  | 4  | 4  | 2  | 2  | 1  | 1  | 1  | 2  | 2  |
| 49 | 3  | 3  | 2  | 3  | 3  | 4  | 3  | 4  | 3  | 2  | 1  | 1  | 1  | 1  | 2  |
| 50 | 4  | 4  | 3  | 2  | 3  | 2  | 2  | 3  | 4  | 3  | 2  | 2  | 2  | 1  | 1  |
| 51 | 5  | 5  | 3  | 2  | 2  | 1  | 1  | 2  | 5  | 4  | 3  | 3  | 3  | 2  | 1  |
| 52 | 5  | 5  | 4  | 3  | 2  | 1  | 1  | 1  | 4  | 4  | 4  | 4  | 4  | 2  | 2  |
| 53 | 5  | 3  | 4  | 3  | 3  | 2  | 1  | 1  | 3  | 4  | 4  | 4  | 4  | 3  | 3  |
| 54 |    | 3  | 5  | 4  | 4  | 3  | 2  | 1  | 3  | 3  | 4  | 4  | 4  | 4  | 3  |
| 55 |    |    | 4  | 5  | 5  | 4  | 4  | 2  | 2  | 3  | 3  | 3  | 3  | 4  | 4  |
| 56 |    |    |    | 4  | 5  | 4  | 5  | 3  | 2  | 2  | 3  | 3  | 3  | 4  | 4  |
| 57 |    |    |    |    | 4  | 4  | 5  | 5  | 3  | 2  | 2  | 2  | 2  | 3  | 3  |
| 58 |    |    |    |    |    | 4  | 5  | 5  | 4  | 3  | 2  | 2  | 2  | 3  | 3  |
| 59 |    |    |    |    |    |    | 4  | 5  | 4  | 3  | 3  | 3  | 3  | 2  | 3  |
| 60 |    |    |    |    |    |    |    | 4  | 5  | 4  | 3  | 3  | 3  | 2  | 2  |
| 61 |    |    |    |    |    |    |    |    | 5  | 4  | 4  | 4  | 4  | 3  | 3  |
| 62 |    |    |    |    |    |    |    |    |    | 4  | 4  | 4  | 5  | 3  | 3  |
| 63 |    |    |    |    |    |    |    |    |    |    | 4  | 4  | 4  | 4  | 3  |
| 64 |    |    |    |    |    |    |    |    |    |    |    | 4  | 4  | 4  | 4  |
| 65 |    |    |    |    |    |    |    |    |    |    |    |    | 3  | 5  | 4  |
| 66 |    |    |    |    |    |    |    |    |    |    |    |    |    | 4  | 4  |
| 67 |    |    |    |    |    |    |    |    |    |    |    |    |    |    | 4  |
| 68 |    |    |    |    |    |    |    |    |    |    |    |    |    |    |    |
| 69 |    |    |    |    |    |    |    |    |    |    |    |    |    |    |    |
| 70 |    |    |    |    |    |    |    |    |    |    |    |    |    |    |    |
| 71 |    |    |    |    |    |    |    |    |    |    |    |    |    |    |    |
| 72 |    |    |    |    |    |    |    |    |    |    |    |    |    |    |    |
| 73 |    |    |    |    |    |    |    |    |    |    |    |    |    |    |    |
| 74 |    |    |    |    |    |    |    |    |    |    |    |    |    |    |    |
| 75 |    |    |    |    |    |    |    |    |    |    |    |    |    |    |    |
| 76 |    |    |    |    |    |    |    |    |    |    |    |    |    |    |    |
| 77 |    |    |    |    |    |    |    |    |    |    |    |    |    |    |    |
| 78 |    |    |    |    |    |    |    |    |    |    |    |    |    |    |    |
| 79 |    |    |    |    |    |    |    |    |    |    |    |    |    |    |    |
| 80 |    |    |    |    |    |    |    |    |    |    |    |    |    |    |    |

FIG 13A

| | 68 | 69 | 70 | 71 | 72 | 73 | 74 | 75 | 76 | 77 | 78 | 79 | 80 |
|---|---|---|---|---|---|---|---|---|---|---|---|---|---|
| 1 | 4 | 2 | 4 | 4 | 4 | 2 | 2 | 2 | 2 | 2 | 2 | 1 | 3 |
| 2 | 3 | 1 | 4 | 3 | 3 | 1 | 2 | 2 | 1 | 1 | 1 | 1 | 2 |
| 3 | 3 | 1 | 3 | 3 | 3 | 1 | 2 | 1 | 1 | 1 | 1 | 1 | 1 |
| 4 | 2 | 2 | 3 | 3 | 3 | 1 | 3 | 2 | 1 | 1 | 1 | 1 | 1 |
| 5 | 2 | 3 | 2 | 2 | 2 | 2 | 3 | 2 | 2 | 2 | 1 | 2 | 1 |
| 6 | 2 | 3 | 2 | 2 | 2 | 3 | 4 | 3 | 3 | 2 | 2 | 3 | 2 |
| 7 | 1 | 4 | 2 | 2 | 2 | 3 | 4 | 4 | 3 | 3 | 3 | 4 | 3 |
| 8 | 1 | 4 | 1 | 1 | 1 | 4 | 4 | 5 | 4 | 4 | 3 | 4 | 3 |
| 9 | 2 | 3 | 2 | 2 | 2 | 4 | 3 | 5 | 4 | 4 | 4 | 4 | 4 |
| 10 | 2 | 3 | 2 | 2 | 2 | 3 | 2 | 5 | 3 | 3 | 5 | 4 | 4 |
| 11 | 3 | 2 | 3 | 3 | 2 | 3 | 2 | 4 | 3 | 3 | 5 | 3 | 4 |
| 12 | 4 | 2 | 3 | 3 | 3 | 2 | 1 | 3 | 3 | 3 | 5 | 2 | 3 |
| 13 | 5 | 3 | 4 | 4 | 4 | 2 | 1 | 2 | 2 | 2 | 5 | 1 | 3 |
| 14 | 5 | 3 | 5 | 5 | 5 | 3 | 2 | 1 | 2 | 2 | 4 | 1 | 2 |
| 15 | 5 | 4 | 5 | 5 | 5 | 3 | 3 | 1 | 3 | 2 | 3 | 1 | 2 |
| 16 | 5 | 5 | 5 | 5 | 5 | 4 | 4 | 1 | 3 | 3 | 3 | 1 | 2 |
| 17 | 4 | 5 | 5 | 5 | 5 | 5 | 4 | 1 | 4 | 3 | 3 | 2 | 2 |
| 18 | 3 | 5 | 4 | 4 | 4 | 5 | 5 | 2 | 5 | 4 | 2 | 3 | 3 |
| 19 | 1 | 4 | 3 | 3 | 3 | 5 | 5 | 3 | 5 | 4 | 2 | 4 | 3 |
| 20 | 1 | 2 | 2 | 2 | 2 | 4 | 4 | 4 | 4 | 4 | 2 | 5 | 4 |
| 21 | 1 | 1 | 1 | 1 | 1 | 3 | 3 | 5 | 4 | 4 | 2 | 5 | 5 |
| 22 | 1 | 1 | 1 | 1 | 1 | 2 | 3 | 5 | 3 | 3 | 3 | 5 | 5 |
| 23 | 2 | 1 | 1 | 1 | 1 | 1 | 2 | 5 | 2 | 3 | 3 | 4 | 5 |
| 24 | 3 | 1 | 2 | 2 | 2 | 1 | 2 | 5 | 1 | 2 | 3 | 3 | 4 |
| 25 | 4 | 3 | 3 | 3 | 3 | 1 | 2 | 4 | 1 | 2 | 4 | 3 | 4 |
| 26 | 5 | 4 | 4 | 4 | 4 | 2 | 3 | 4 | 1 | 1 | 4 | 2 | 3 |
| 27 | 5 | 5 | 5 | 5 | 4 | 3 | 3 | 3 | 2 | 2 | 5 | 2 | 2 |
| 28 | 4 | 5 | 5 | 5 | 5 | 4 | 4 | 2 | 3 | 2 | 5 | 2 | 2 |
| 29 | 3 | 5 | 4 | 4 | 4 | 5 | 4 | 2 | 4 | 3 | 5 | 2 | 1 |
| 30 | 2 | 5 | 4 | 3 | 4 | 5 | 4 | 1 | 5 | 3 | 4 | 3 | 1 |
| 31 | 2 | 3 | 3 | 3 | 3 | 5 | 3 | 1 | 5 | 4 | 3 | 3 | 1 |
| 32 | 2 | 3 | 2 | 2 | 2 | 4 | 3 | 1 | 5 | 3 | 3 | 3 | 1 |
| 33 | 2 | 2 | 2 | 2 | 2 | 3 | 2 | 1 | 5 | 3 | 2 | 3 | 2 |
| 34 | 3 | 1 | 2 | 2 | 2 | 2 | 1 | 2 | 4 | 3 | 1 | 2 | 2 |
| 35 | 3 | 1 | 2 | 3 | 2 | 1 | 1 | 3 | 3 | 2 | 1 | 1 | 3 |
| 36 | 4 | 1 | 3 | 3 | 3 | 1 | 1 | 3 | 2 | 2 | 2 | 1 | 3 |
| 37 | 3 | 2 | 3 | 3 | 3 | 1 | 2 | 4 | 1 | 2 | 2 | 1 | 4 |
| 38 | 3 | 3 | 4 | 4 | 4 | 1 | 2 | 5 | 1 | 2 | 3 | 1 | 4 |
| 39 | 3 | 3 | 3 | 3 | 3 | 2 | 3 | 5 | 1 | 3 | 4 | 2 | 5 |
| 40 | 2 | 4 | 3 | 3 | 3 | 3 | 4 | 5 | 1 | 3 | 5 | 3 | 5 |

FIG 13B

|    | 68 | 69 | 70 | 71 | 72 | 73 | 74 | 75 | 76 | 77 | 78 | 79 | 80 |
|----|----|----|----|----|----|----|----|----|----|----|----|----|----|
| 41 | 2  | 4  | 3  | 3  | 3  | 3  | 5  | 4  | 2  | 4  | 5  | 4  | 4  |
| 42 | 3  | 5  | 2  | 2  | 2  | 4  | 5  | 4  | 3  | 4  | 5  | 5  | 4  |
| 43 | 3  | 5  | 2  | 2  | 2  | 4  | 5  | 3  | 3  | 4  | 4  | 5  | 3  |
| 44 | 4  | 5  | 3  | 3  | 2  | 5  | 5  | 2  | 4  | 4  | 3  | 5  | 3  |
| 45 | 5  | 4  | 3  | 3  | 3  | 5  | 4  | 2  | 4  | 3  | 2  | 5  | 2  |
| 46 | 5  | 4  | 4  | 4  | 3  | 5  | 4  | 2  | 5  | 3  | 2  | 4  | 1  |
| 47 | 4  | 3  | 5  | 5  | 4  | 4  | 3  | 3  | 5  | 2  | 2  | 3  | 1  |
| 48 | 3  | 2  | 5  | 5  | 5  | 4  | 3  | 3  | 5  | 2  | 2  | 3  | 1  |
| 49 | 2  | 1  | 4  | 4  | 5  | 3  | 2  | 4  | 5  | 1  | 3  | 2  | 1  |
| 50 | 1  | 1  | 4  | 4  | 4  | 3  | 1  | 4  | 4  | 1  | 3  | 1  | 2  |
| 51 | 1  | 1  | 3  | 3  | 3  | 2  | 1  | 4  | 3  | 2  | 4  | 1  | 3  |
| 52 | 1  | 2  | 2  | 2  | 2  | 1  | 1  | 4  | 3  | 2  | 5  | 1  | 4  |
| 53 | 2  | 3  | 1  | 1  | 2  | 1  | 1  | 3  | 2  | 3  | 5  | 1  | 5  |
| 54 | 3  | 3  | 1  | 1  | 1  | 1  | 2  | 2  | 1  | 3  | 5  | 2  | 5  |
| 55 | 3  | 4  | 1  | 1  | 1  | 2  | 3  | 2  | 1  | 4  | 4  | 2  | 5  |
| 56 | 4  | 4  | 2  | 2  | 2  | 3  | 4  | 1  | 1  | 4  | 3  | 3  | 4  |
| 57 | 4  | 4  | 3  | 3  | 2  | 3  | 5  | 1  | 2  | 4  | 2  | 3  | 3  |
| 58 | 4  | 3  | 4  | 4  | 3  | 4  | 5  | 2  | 2  | 4  | 2  | 3  | 3  |
| 59 | 3  | 3  | 4  | 4  | 4  | 4  | 5  | 3  | 3  | 3  | 1  | 4  | 2  |
| 60 | 3  | 2  | 4  | 4  | 4  | 4  | 5  | 4  | 4  | 3  | 1  | 4  | 1  |
| 61 | 2  | 2  | 4  | 4  | 4  | 3  | 4  | 4  | 4  | 3  | 2  | 4  | 1  |
| 62 | 2  | 2  | 3  | 3  | 4  | 3  | 3  | 5  | 4  | 2  | 2  | 4  | 1  |
| 63 | 3  | 3  | 3  | 3  | 3  | 2  | 2  | 5  | 4  | 2  | 3  | 3  | 2  |
| 64 | 3  | 4  | 2  | 2  | 3  | 2  | 1  | 4  | 3  | 1  | 3  | 3  | 3  |
| 65 | 3  | 5  | 2  | 2  | 2  | 2  | 1  | 3  | 3  | 1  | 4  | 2  | 3  |
| 66 | 4  | 5  | 3  | 3  | 2  | 3  | 1  | 3  | 2  | 1  | 4  | 2  | 3  |
| 67 | 4  | 5  | 3  | 3  | 3  | 3  | 2  | 2  | 2  | 1  | 4  | 1  | 4  |
| 68 | 4  | 4  | 4  | 3  | 3  | 4  | 3  | 2  | 2  | 2  | 3  | 1  | 3  |
| 69 |    | 3  | 4  | 4  | 3  | 5  | 4  | 3  | 3  | 3  | 3  | 1  | 3  |
| 70 |    |    | 4  | 4  | 4  | 5  | 5  | 3  | 3  | 3  | 3  | 1  | 3  |
| 71 |    |    |    | 4  | 4  | 4  | 5  | 4  | 4  | 4  | 3  | 2  | 2  |
| 72 |    |    |    |    | 4  | 4  | 4  | 4  | 5  | 5  | 4  | 3  | 2  |
| 73 |    |    |    |    |    | 3  | 4  | 4  | 5  | 5  | 4  | 4  | 3  |
| 74 |    |    |    |    |    |    | 3  | 4  | 5  | 5  | 5  | 5  | 3  |
| 75 |    |    |    |    |    |    |    | 3  | 4  | 5  | 5  | 5  | 4  |
| 76 |    |    |    |    |    |    |    |    | 3  | 4  | 5  | 5  | 4  |
| 77 |    |    |    |    |    |    |    |    |    | 3  | 4  | 4  | 5  |
| 78 |    |    |    |    |    |    |    |    |    |    | 3  | 3  | 5  |
| 79 |    |    |    |    |    |    |    |    |    |    |    | 2  | 4  |
| 80 |    |    |    |    |    |    |    |    |    |    |    |    | 3  |

US 7,769,567 B2

METHOD FOR DESIGNING TIRE NOISE PITCH SEQUENCE

CROSS REFERENCE TO RELATED APPLICATION

This application claims priority from U.S. Provisional Patent Application Ser. No. 60/423,094 filed Nov. 1, 2002; the disclosure of which are incorporated herein by reference.

BACKGROUND OF THE INVENTION

1. Technical Field

The present invention generally relates to methods of designing tread patterns for tire noise. More particularly, the invention relates to a method for designing tread pattern tire noise pitch sequences by pre-selecting variations in lug stiffness characteristics. The invention specifically relates to a method for designing tire noise pitch sequences to achieve preferred characteristics of variations in tread lug stiffness based on the distribution of the lugs in the tire noise pitch sequence.

2. Background Information

One aspect of tire design involves minimizing undesirable tire noise. Tire noise is generated when the lugs of the tread pattern contact the road surface. An unvarying tread pattern, or mono pitch tread pattern, creates an undesirable tonal, or mono pitch sound. Tire designers vary the tread pattern to avoid mono pitch sounds. The tread patterns are typically varied by altering the size of the tread pitches around the circumference of the tire. Varying the sizes of the tread pitches tends to reduce mono pitch tire noise by broadening the frequency domain of the noise spectrum but undesirable noise in the time domain can still be created.

Tread patterns are currently analyzed by comparing the tire noise generated by different variations in the tread pitches. Known analysis techniques allow the tire designer to select a pitch pattern for the tread design that generates acceptable tire noise. One such technique uses the Fourier spectrum of the pitch sequence to identify objectionable pitch sequences. Another technique disclosed in U.S. Pat. No. 6,112,167 analyzes portions of the pitch sequence around the circumference of the tire. Although these techniques have been effective, tire designers have found that known techniques can result in tire noise pitch sequence designs that pass initial screening while still having undesirable tire noise. Tire molds having such sequences must be rebuilt or modified to reduce the undesirable noise. One cause of undesirable noise is tire noise attributed to the variations in the lug stiffness around the circumference of the tire.

When the size of the tread pitches is varied, the size of the lugs of the tread pattern is varied. The lugs thus have different stiffnesses and produce different sound amplitudes when they contact the road surface. These differences create sound amplitude variation that can make an otherwise desirable pitch sequence undesirable. In the past, this undesirable tire noise was not analyzed and tires would be produced before the undesirable noise was recognized. If the customer objected to the noise, the tire manufacturer would have to scrap the expensive tire mold or would have to modify the mold. In response to this issue, the art thus desired a secondary screening method that allows the tire designer to compare a group of otherwise desirable pitch sequences. This screening technique is disclosed in pending patent application US 2003/0040886 A1 dated Feb. 27, 2003, which describes a method for comparing tread designs based on tire noise generated by tire tread lug stiffness variation. The art thus desires a method to develop tread designs with pre-selected lug stiffness variation characteristics. Such a tread pattern design method would define tire noise pitch sequences for optimized lug stiffness variations and tire noise level characteristics. FIGS. 1A-C and 2A-C demonstrate the inherent difficulties in defining tire noise pitch sequences with optimized lug stiffness variations and tire noise level characteristics. FIGS. 1A-C provide for a 60-pitch noise sequence with good level characteristics, but poor lug stiffness (further referred to as modulation) characteristics. Good level characteristics consist of a smooth spectrum about the first tread passage harmonic range that is centered at 60 harmonics for 60 pitches. Notice that for the sequence depicted in FIG. 1C, there is relatively high modulation levels at the first and second modulation order. These high levels would translate to a tire tread pattern with a strong once and twice per revolution noise variation. A tire pattern with good modulation characteristics would have low modulation levels. FIGS. 2A-C demonstrate a tire noise pitch sequence with good modulation characteristics. An analysis of the harmonic content of this sequence provides for a narrow, tonal band of energy about the $60^{th}$, $120^{th}$, $180^{th}$ harmonic and subsequent multiples of 60 harmonics with high, undesirable, level characteristics.

SUMMARY OF THE INVENTION

In view of the foregoing, the present invention provides a method of defining tire noise pitch sequences based on preferred characteristics of the tire noise generated by tire tread lug stiffness variations. The method of the invention may be used to provide a tire noise pitch sequence with preferred modulation characteristics and good level characteristics.

The invention provides a method including the steps of defining the amplitudes of the modulation orders; defining the phases for each order; summing the functions for each order; and defining the tire noise pitch sequence from the summation of the functions.

The invention also provides a tire having a pitch sequence designed from the method of the invention. In one embodiment, the invention provides a tire having a body having a tread that has a pitch sequence; and the pitch sequence having five different size pitches with pitch ratios of 1.00, 1.10, 1.25, 1.4, and 1.50.

BRIEF DESCRIPTION OF THE DRAWINGS

FIG. 1A is a graph showing the harmonic analysis result for a tire with a good harmonic spectrum; the X axis being the harmonic spectrum of event occurrences per tire revolution and the Y axis being the amplitude.

FIG. 1B is a graph showing the modulation analysis result for a tire with bad modulation orders; the X axis being the modulation order and the Y axis being the amplitude.

FIG. 1C is the pitch sequence analyzed in FIGS. 1A and 1B with the pitch ratios listed at the end of the pitch sequence.

FIG. 2A is a graph showing the harmonic analysis result for a tire with a bad harmonic spectrum; the X axis being the harmonic spectrum of event occurrences per tire revolution and the Y axis being the amplitude.

FIG. 2B is a graph showing the modulation analysis result for a tire with good modulation orders; the X axis being the modulation order and the Y axis being the amplitude.

FIG. 2C is the pitch sequence analyzed in FIGS. 2A and 2B with the pitch ratios listed at the end of the pitch sequence.

FIGS. 12A and 12B are a chart of exemplary pitch sequences designed in accordance with the present invention (FIG. 12B is a continuation of FIG. 12A).

FIGS. 13A and 13B are a chart of exemplary pitch sequences designed in accordance with the present invention (FIG. 12B is a continuation of FIG. 12A).

DETAILED DESCRIPTION OF THE PREFERRED EMBODIMENT

The first part of the method is to define the preferred modulation characteristics and to build a function based on the combined modulation characteristics. It is generally known in the art that a first or second order is undesirable. Lug stiffness variations of the first order can magnify any imbalance or out of round in the tire relating to uniformity performance. As the order increases the effect on uniformity is diminished. Thus it is preferred to minimize the first two modulation orders. It is not prudent, though, to minimize all of the modulation orders, because the only way to have a noise treatment without modulation, is one in which all of the pitch sizes are the same. This type of sequence, commonly referred to as a mono pitch, produces a constant tone or mono pitch sound, which is also undesirable. Thus, it is desired to have some modulation in each of the orders 3 and above. It is desirable to have a smooth transition of the modulation orders. The number of modulation orders and the levels selected can vary. It has been found that it is not necessary to analyze modulation orders higher than seven because they generally approach zero and the analysis of these orders consumes too much processing time compared to the benefit received from the analysis.

In order to show an example of the invention, the data shown in Table 1 is analyzed in the following description. Table 1 lists the pre-selected levels for the selected modulation orders. Although the levels for the first and second orders preferably are selected to be zero in the exemplary embodiment, values other than zero may be used with the method of the present invention as long as these values are minimized with respect to the remaining orders. It is also desirable to set the value of the third order to be less than the values of the fourth and fifth orders. As noted above, all of the values cannot be set to zero because a monopitch would be the result. The levels should be set high enough to avoid a monopitch while low enough to avoid undesirable tones. The individual level can range from as little as 0 to as much as 20. The preferred embodiment sets a preferable range of between 1 to 5 for modulation orders above and including 3. The numbers in Table 1 meet these limitations and provide a smooth transition between different orders.

TABLE 1

| Order | Level |
|---|---|
| 1 | 0 |
| 2 | 0 |
| 3 | 1.5 |
| 4 | 2.2 |
| 5 | 2.25 |
| 6 | 2 |
| 7 | 1.5 |

After the levels for the modulation orders have been defined, a complex wave is created by a summation of cosine waves with pre-selected amplitude and phase characteristics. Equation 1 is the Fourier series expansion of the cosine functions.

$$Y = \sum_{k=1}^{n} A_k \cos(k \cdot \theta + \varphi_k)$$

... where Y is the resultant function, $A_k$ are the amplitudes of each $k^{th}$ order, theta is the angle from 1 to 360 degrees and $phi_k$ is the phase angle of the $k^{th}$ order.

Figure 3:
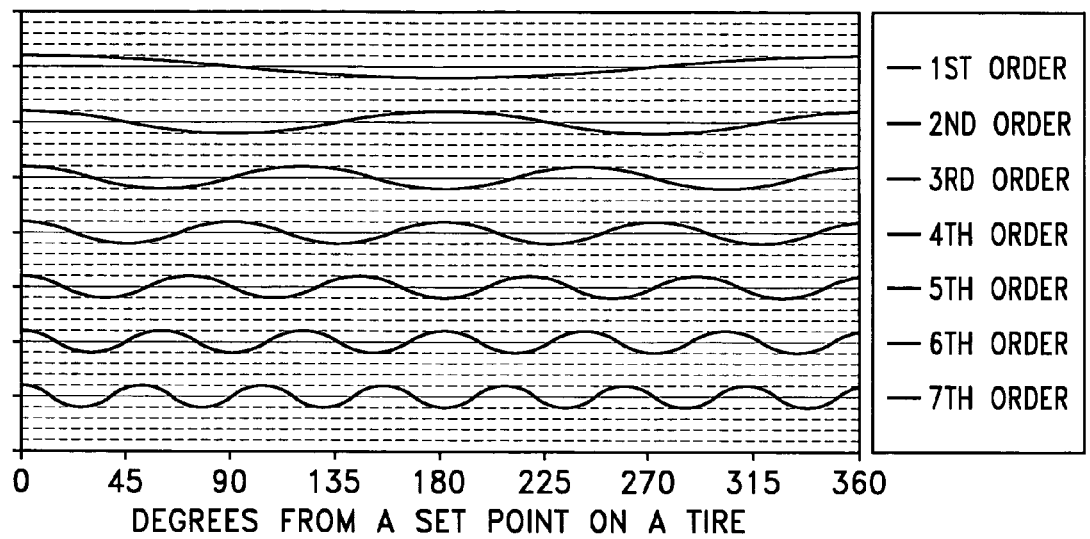
FIG. 3 is a graph showing a series of seven cosine functions with zero phase and equal amplitude; the X axis being degrees from a set point on a tire and the Y axes being amplitudes.
Figure 4:
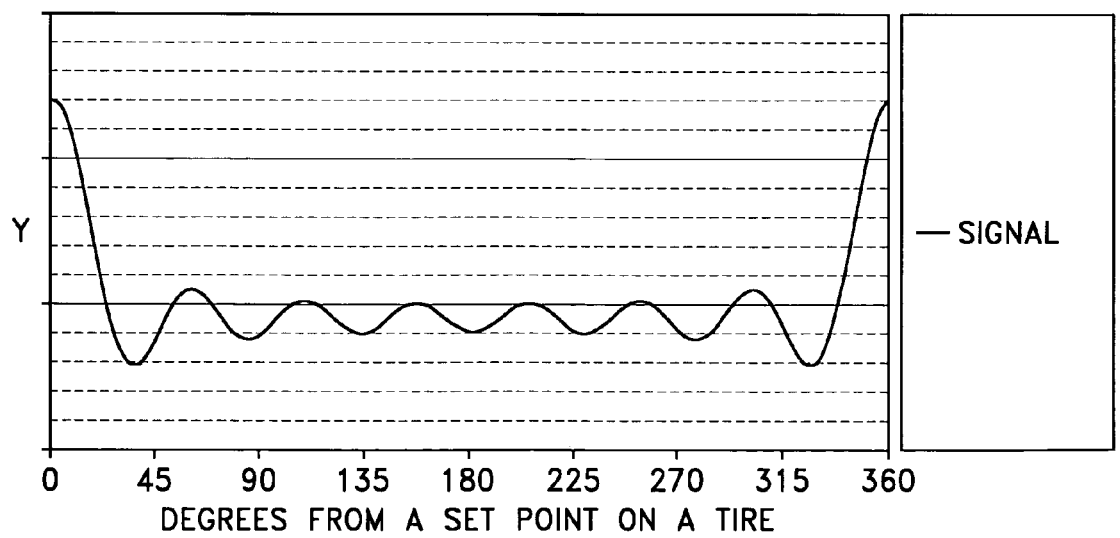
FIG. 4 is a graph showing the Y function for the seven signals of FIG. 3; the X axis being degrees from a set point on a tire and the Y axis being amplitude.
Figure 5:
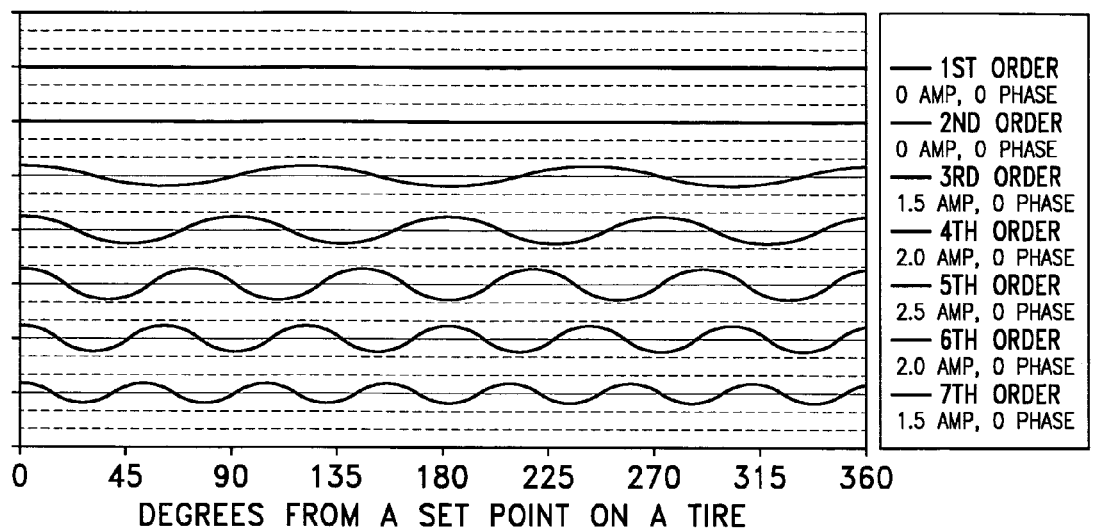
FIG. 5 is a graph showing the series of functions from Table 2, Set 1; the X axis being degrees from a set point on a tire and the Y axis being amplitude.

FIG. 3 graphically shows a series of 7 cosine functions with zero phase and equal amplitude. FIG. 4 shows the function, Y, for the 7 signals of FIG. 3.

By building a series of Y functions for a set of pre-defined $A_k$ values as defined in table 1, noise sequences can be defined by randomly, or in an orderly manner, defining the phase angles, phi$_k$, for each order. The phase angles may be defined in an orderly manner by looping through the potential phases at a fixed increment such as 1 degree. Table 2 shows two sets of phases. The first set has all of the modulation orders in phase and the second set has orders 4 through 7 with varying phase.

TABLE 2

| | | Phase Angles in Degrees | |
| --- | --- | --- | --- |
| Order | Level | Set 1 In Phase | Set 2 Phased |
| 1 | 0 | 0* | 0* |
| 2 | 0 | 0* | 0* |
| 3 | 1.5 | 0** | 0** |
| 4 | 2.2 | 0 | 97 |
| 5 | 2.25 | 0 | −73 |
| 6 | 2 | 0 | −105 |
| 7 | 1.5 | 0 | 4 |

*Phase angle for 0 amplitude is irrelevant
**All non-zero order phases are relative to lowest non-zero order FIGS. 5, 6, 7 and 8 represent the waves for each curve with specified phase as well as the resultant wave shape, which is a representation of the lug stiffness variation of some tire noise treatment. A computer may be used to generate a large number of modulation characteristics including different amplitudes and phase angles. A computer program may be used to create a wide variety of resultant waves shapes that are then used to design a wide variety of pitch sequences that are then compared to obtain desirable pitch sequences.

The second part of the method constructs a tire noise pitch sequence where the calculation of the lug stiffness variation curve matches, as closely as possible, the resultant wave shape. The shape of the lug stiffness variation curve D, as discussed in prior art (publication no. US 2003/0040886 A1 dated Feb. 27, 2003), is defined as the accumulation of the deviation of the arc length from the arc length of the mean pitch size. D is a vector of the difference in the actual arc length from a fixed arbitrary reference point to the end of the $i^{th}$ pitch size.

$$D = \{D_1, D_2, D_3, \ldots, D_i, \ldots D_{N-1}, D_N\}$$

N is the total number of tread pitches placed about the circumference of the tire. $D_i$ can be calculated using the following relationship:

$$D_i = X_i - \overline{X}_i$$

$$X_i = \sum_{j=1}^{i} L_j$$

$$\overline{X}_i = i \times \frac{C}{N}$$

wherein:
  $X_i$ is the arc length from the fixed reference point to the end of the $i^{th}$ tread pitch.
  $\overline{x}_i$ is the arc length of i pitches times the mean pitch size.
  $L_j$ is the pitch length of the $j^{th}$ tread pitch.
  C is the tire circumference in degrees=360 degrees.
  N is the number of tire tread pitches.
  Y is a function of circumferential angle, theta. $Y_i$ can be defined as the target curve, Y, evaluated at the at i times the circumference, C, divided by the number of pitches, N.

$$Y_i = Y \big|_{\theta = i \times \frac{C}{N}}$$

$D_i$, the design curve shape at i is an approximation of $Y_i$.

$$Y_i \cong D_i$$

$$Y_i \cong \sum_{j=1}^{i} L_j - i \times \frac{C}{N}$$

$$\sum_{j=1}^{i} L_j \cong Y_i + i \times \frac{C}{N}$$

Once the desired number or tread pitches, N, each pitch length can then found in sequential order. For reference in this example N=60, although N can range from as low as 20 to as high as 100 total pitches. The first size is found by solving the equation for i=1 with N=60 & C=360.

$$\sum_{j=1}^{1} L_j = Y_1 + 1 \times \frac{360}{60}$$

$$L_1 = Y_1 + 6$$

The second size is found in the same manner as the first while utilizing $L_1$.

$$\sum_{j=1}^{2} L_j = Y_2 + 2 \times \frac{360}{60}$$

$$L_1 + L_2 = Y_2 + 12$$

$$L_2 = Y_2 + 12 - L_1$$

$$L_2 = Y_2 + 12 - (Y_1 + 6)$$

$$L_2 = (Y_2 - Y_1) + 6$$

The general form of the solution of the $L_i$ array is as follows.

$$L_{i=1} = Y_i + \frac{C}{N}$$

$$L_{i \geq 2} = Y_i - \sum_{j=1}^{i-1} Y_j + \frac{C}{N}$$

This process will define a unique set of pitch sizes, $L_i$, which will give the specified lug stiffness variation characteristics. $L_i$ will yield N unique pitch lengths. N unique tire tread pitch lengths, while desired by the tire noise pitch sequence designer, is impractical when considering the design of a tire mold. The higher the number of unique pitch lengths, the higher the complexity and cost associated with the production of the tire mold. The art typically uses as few as 2 to as many as 10 unique pitch sizes in order to decrease the complexity of the mold making process. If desired, a larger number of pitch sizes may be used.

The third part of the method involves converting from N unique pitch sizes to M prescribed pitch sizes. A numeric value is selected that defines the ratio between the largest pitch size to the smallest pitch size (the pitch ratio). This pitch ratio typically ranges from 1.2 to 1.8, but other ratios are not outside the embodiment of this method. For the purposes of continuing the example of N=60, M is chosen as 3 and the pitch ratio, P, is set at 1.5. The three sizes, designated as 1, 2, and 3 have the internal pitch ratios of 1.00, 1.25, and 1.50 respectively. The N unique pitch sizes are then fit to the M selected sizes. For example, if N ranges from 3.5 degrees to 6.5 degrees, size 1 may be set to include all N sizes from 3.5 degrees to 4.5 degrees; size 2 may be set to include all N sizes from 4.5 degrees to 5.5 degrees; and size 3 may be set to include all N sizes from 5.5 degrees to 6.5 degrees. If this example, size 1 may be 4 degrees, size 2 may be 5 degrees, and size 3 may be 6 degrees. The pitch ratio is 6/4 or 1.5.

Figure 6:
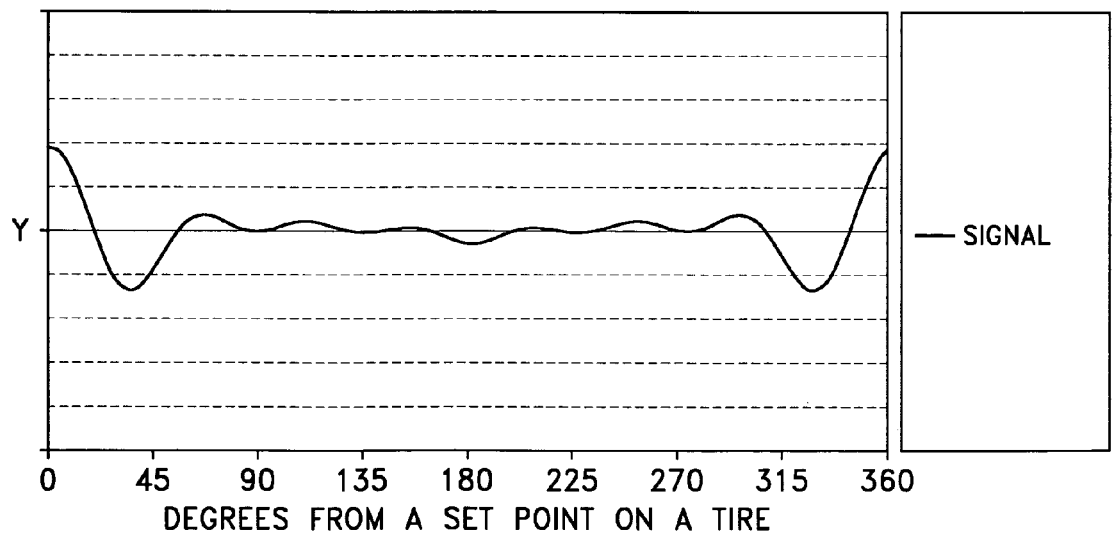
FIG. 6 is the Y function for the functions of FIG. 5; the X axis being degrees from a set point on a tire and the Y axis being amplitude.
Figure 7:
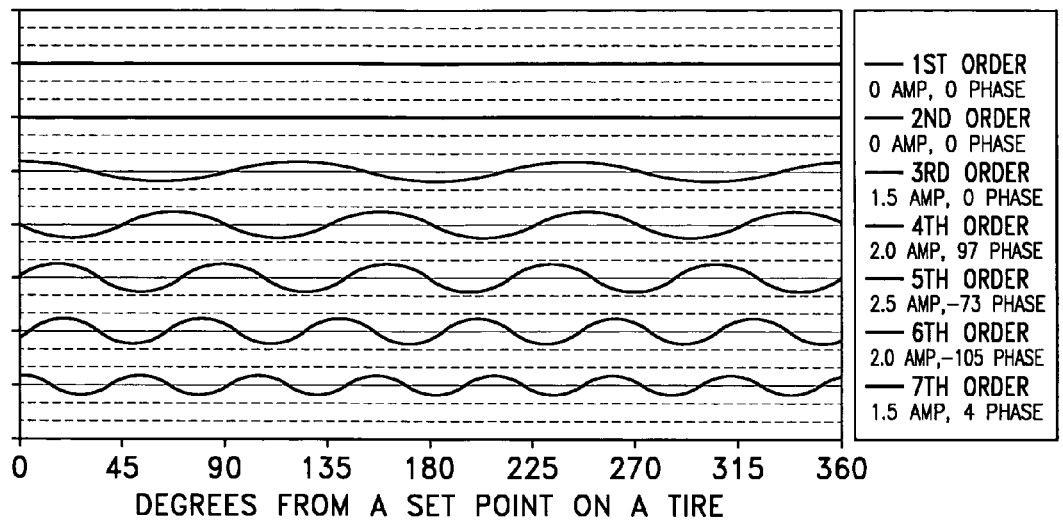
FIG. 7 is a graph showing the series of functions from Table 2, Set 2; the X axis being degrees from a set point on a tire and the Y axis being amplitude.
Figure 8:
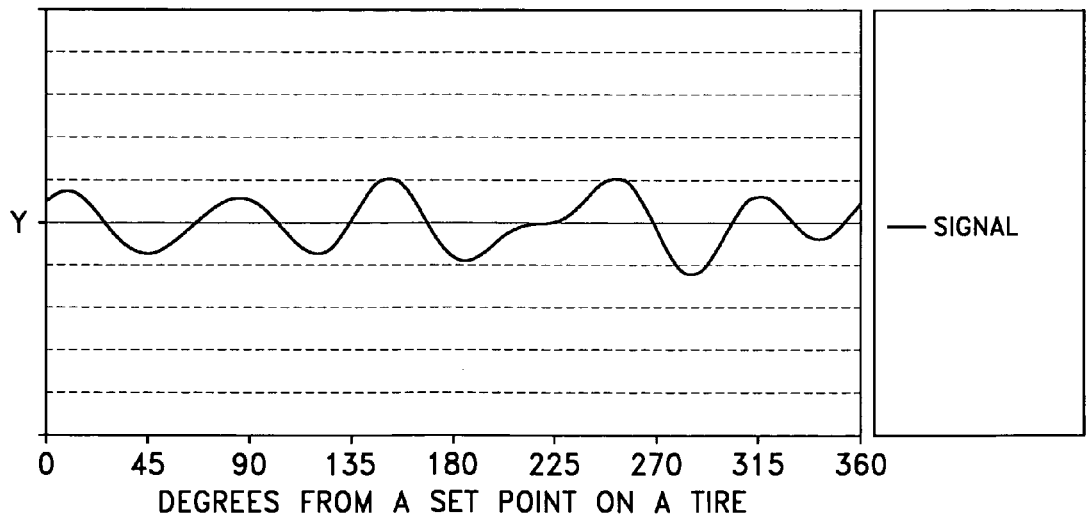
FIG. 8 is the Y function for the functions of FIG. 7; the X axis being degrees from a set point on a tire and the Y axis being amplitude.
Figure 9A:
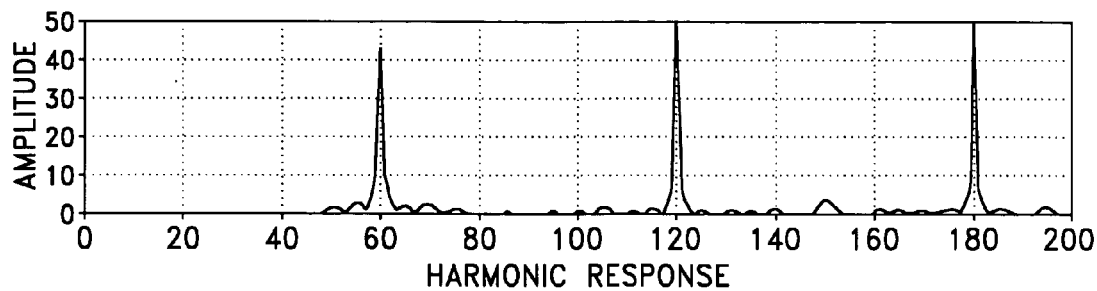
FIG. 9A is a graph showing the harmonic analysis result of the pitch sequence designed from the curve of FIG. 6; the X axis being the harmonic response and the Y axis being the amplitude.
Figure 9B:
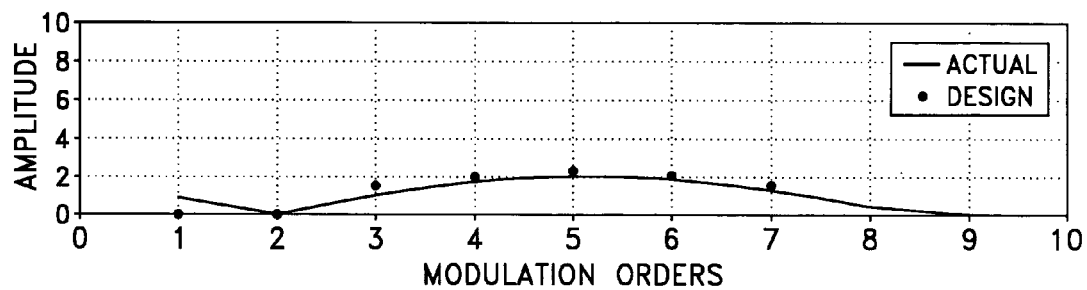
FIG. 9B is a graph showing the modulation analysis result of the pitch sequence designed from the curve of FIG. 6; the X axis being the modulation orders and the Y axis being the amplitude.
Figure 9C:
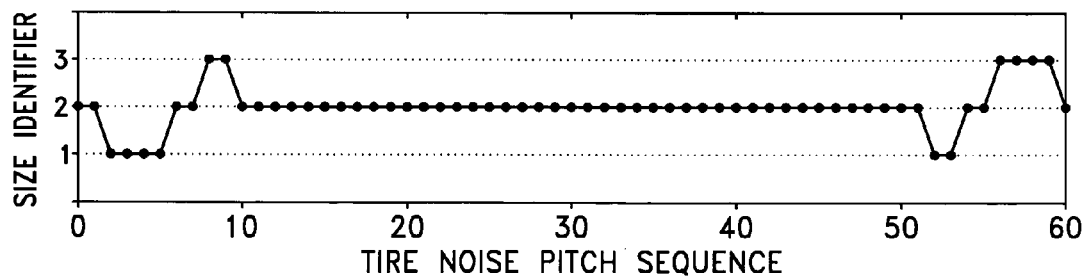
FIG. 9C is a graph showing the pitch sequence designed from the curve of FIG. 6; the X axis being the pitch number and the Y axis being the pitch size.
Figure 9D:
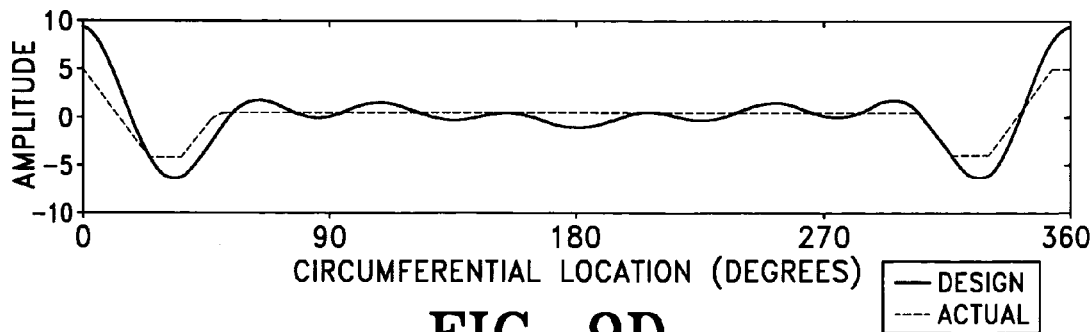
FIG. 9D is a graph showing the comparison between the target design curve and the actual curve obtained from the designed pitch sequence; the X axis being location in degrees and the Y axis being the amplitude.
Figure 10A:
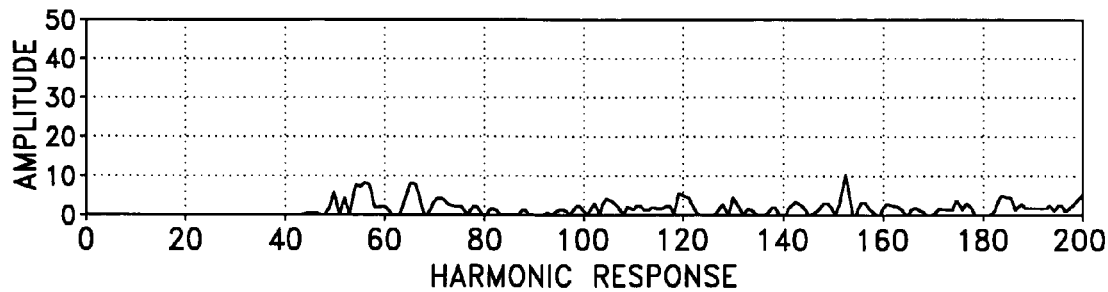
FIG. 10A is a graph showing the harmonic analysis result of the pitch sequence designed from the curve of FIG. 8; the X axis being the harmonic response and the Y axis being the amplitude.
Figure 10B:
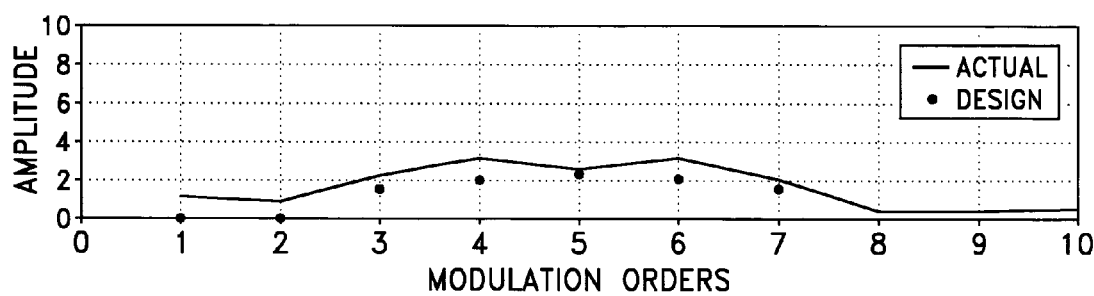
FIG. 10B is a graph showing the modulation analysis result of the pitch sequence designed from the curve of FIG. 8; the X axis being the modulation orders and the Y axis being the amplitude.
Figure 10C:
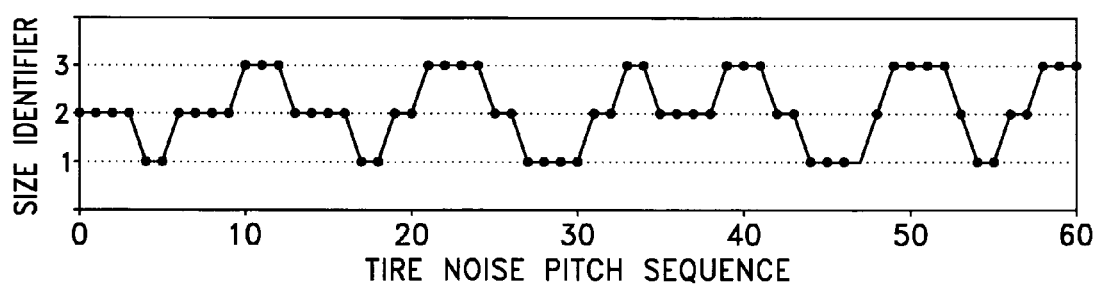
FIG. 10C is a graph showing the pitch sequence designed from the curve of FIG. 8; the X axis being the pitch number and the Y axis being the pitch size.
Figure 10D:
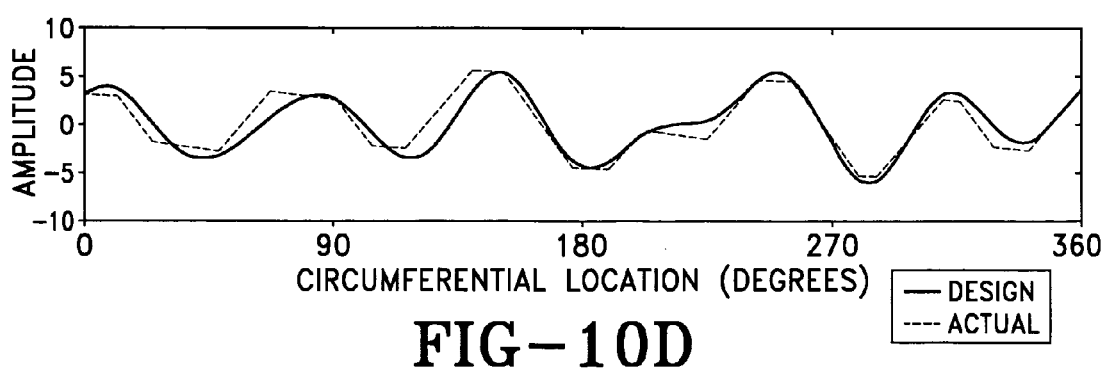
FIG. 10D is a graph showing the comparison between the target design curve and the actual curve obtained from the designed pitch sequence; the X axis being location in degrees and the Y axis being the amplitude.

FIGS. 9 and 10 show the two pitch sequences for N=60, M=3, and P=1.5 for the two resultant wave curves from FIGS. 6 and 8 respectively that contain the amplitude and phase information from table 2.

As can be seen, the actual response function, bottom set of curves in FIGS. 9 and 10, is set to match as closely as possible, the design response function. Additionally, as can be seen, the actual set of modulation order amplitudes has the basic features for good modulation performance. The reason the actual modulation amplitudes and the design modulation amplitudes vary is the selection of M=3 design sizes rather than N unique design sizes.

Another pitch design that has been found to be particularly useful with the method of the present invention is a pitch design having five different pitch sizes defined by the pitch ratios of 1.00 (smallest pitch length), 1.10, 1.25, 1.4, and 1.5 (largest pitch length). This type of pitch design has been found to be useful for creating pitch sequences having between 53 and 80 pitches. Exemplary pitch sequences that have been designed using the method of the present invention and this pitch design include the following pitch sequences for 53 pitch, 68 pitch, and 80 pitch sequences.

53 pitch
32111233444333323344321113455421113444322233322-234555

68 pitch
44443322211223455554311112345543222233433322334-554322111233-4443322333

80 pitch
33211123344433222233455544322111122334455443321-1112345554332-11123334333223344554

Figure 12:
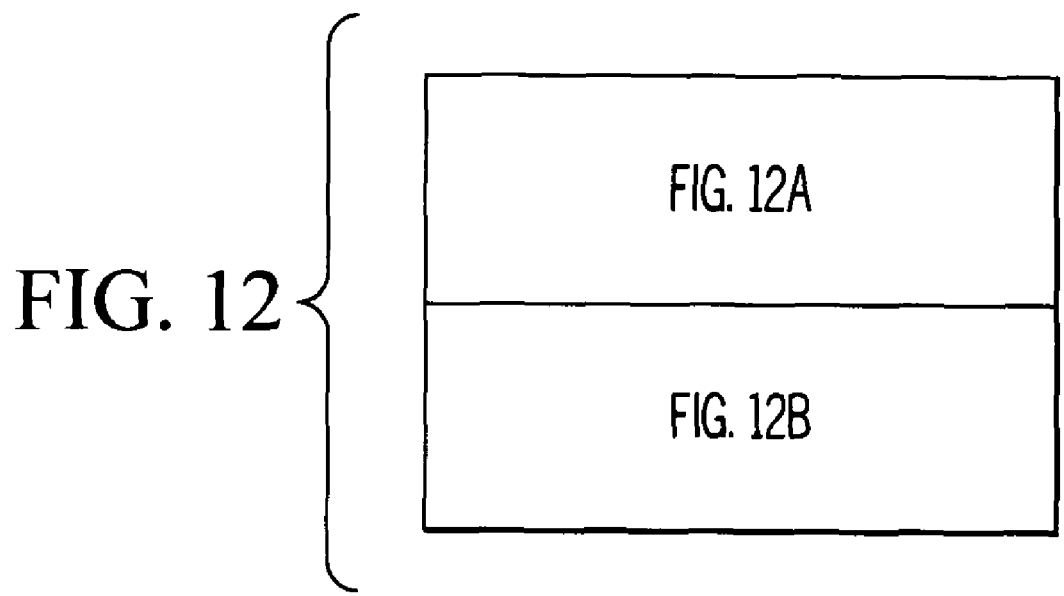
FIG. 12 shows the relationship between FIGS. 12A and 12B and showing exemplary pitch sequences for 53-67 pitch designs.
Figure 13:
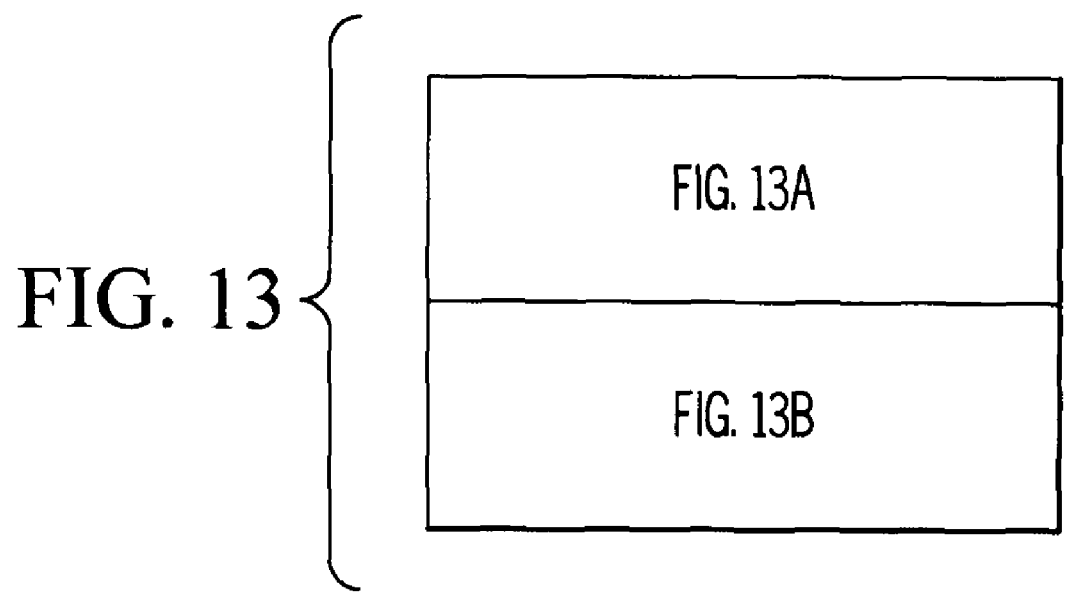
FIG. 13 shows the relationship between FIGS. 13A and 13B and showing exemplary pitch sequences for 68-80 pitch designs.

These pitch sequences have been found to have prescribed modulation (as defined by the method described above) and controlled higher harmonics. Additional examples are shown in FIGS. 12 and 13.

The fourth part of the model involves selecting a tire noise treatment. The tire noise treatment can be selected in any number of ways used by one skilled in the art. Preferably, for a tire noise treatment to be acceptable it should have good level characteristics. A comparison of the two tire noise treatments, A and B, from FIGS. 9 and 10 respectively, provides that the modulation performance of designs A and B are similar, but design A has a narrow band with high amplitude and is therefore undesirable. Design B has both good level and amplitude characteristics and therefore would be a candidate to be used in a design. Design B thus provides a tire noise pitch sequence that has both good modulation and good level characteristics. In past design methods, the art recognized bad modulation as a byproduct of a design with good level characteristics. The method described above allows the designer to create tire noise pitch sequences having good performance for both modulation and level.

Figure 11:
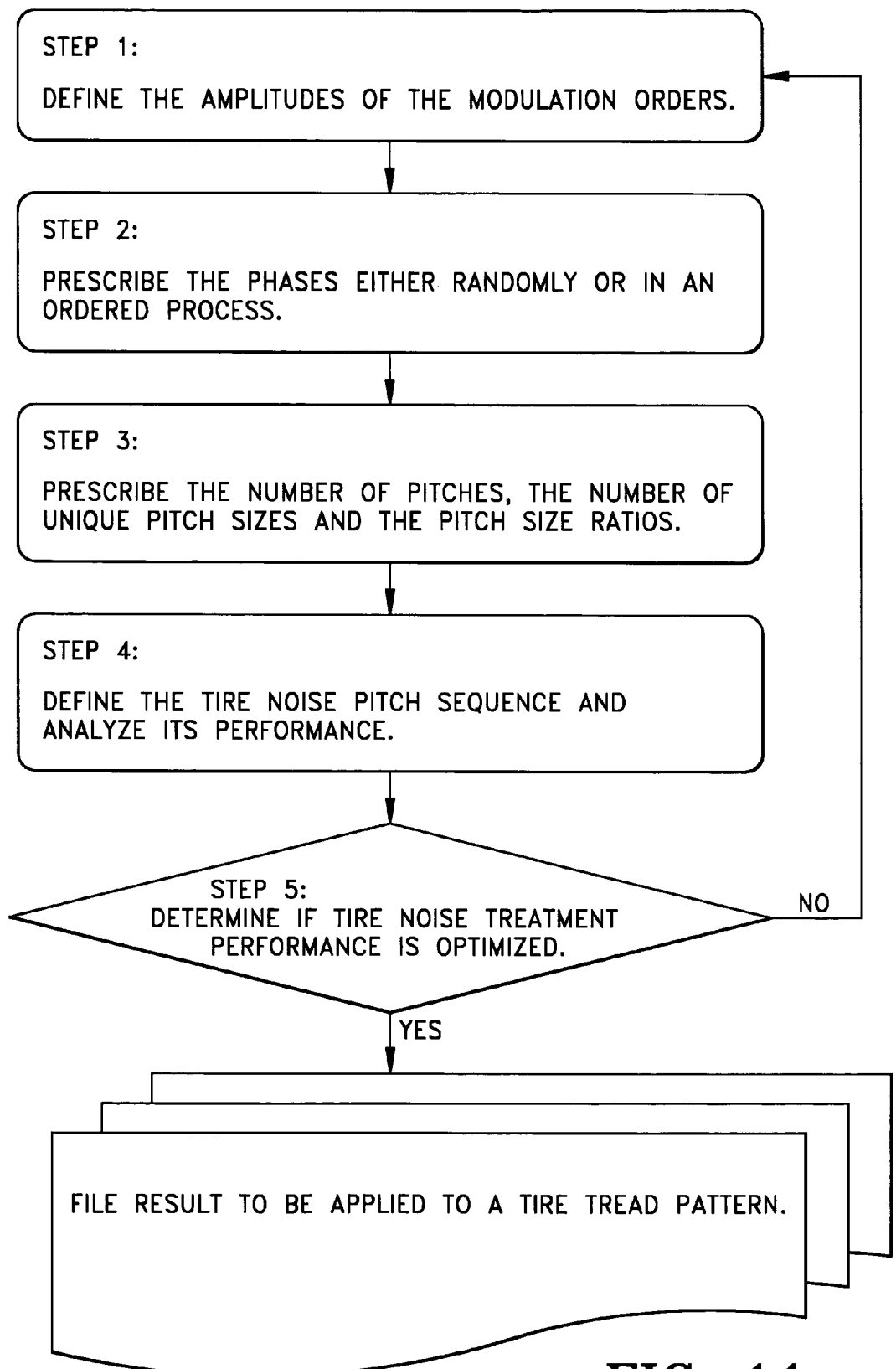
FIG. 11 is a flow chart showing a method for creating and comparing tire noise pitch sequences.

FIG. 11 shows a method for creating and comparing tire noise pitch sequences. Block 1 is the step of defining the amplitudes of the modulation orders. Block 2 is the step of prescribing the phases (either orderly or randomly). Block 3 is the step of prescribing the number of pitches, the number of unique pitch sizes, and the pitch size ratios. Block 4 is the step of defining the tire noise pitch sequence and analyzing its performance. Block 5 is the step of determining the tire noise pitch sequence is optimized. If the answer is no, the user goes back to Block 1. If the answer is yes, the user proceeds to Block 6 where the pitch sequence is stored for use on a tire. This method allows the user to create a catalog of acceptable pitch sequences that may be used on future tires.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method for forming a tire tread having a tire noise pitch sequence for a pneumatic tire; the method comprising the steps of:

selecting three, four, five, six, or seven modulation orders;
defining an amplitude for each of the selected modulation orders;
defining a phase for each selected modulation order;
creating a function for each modulation order that includes the defined amplitude and phase of the modulation order;
summing the created functions for each modulation order to create a wave Y having a curve;
defining a lug stiffness variation curve (Di) to be the accumulation of the deviation of arc length from arc length of mean pitch size;
setting the lug stiffness variation curve equal to the curve of the Y wave to define an equation;
solving the equation to obtain a unique set of pitch sizes;
using the unique set of pitch sizes to define a tire noise pitch sequence and
arranging tread lugs on a tire tread of a pneumatic tire to match the tire noise pitch sequence.

2. The method of claim 1, further comprising the steps of selecting a total number of pitches, five different pitch sizes, and pitch ratios of 1.00, 1.10, 1.25, 1.40, and 1.50; and fitting the unique set of pitch sizes to the selected five pitch sizes.

3. The method of claim 1, further comprising the steps of selecting a total number of pitches, three different pitch sizes, and pitch ratios of 1.00, 1.25, and 1.50; and fitting the unique set of pitch sizes to the selected three pitch sizes.

4. The method of claim 1, further comprising the step of defining the amplitudes of the first and second modulation orders to be smaller than the amplitudes of the remaining selected modulation orders.

5. The method of claim 4, further comprising the step of defining the amplitudes of the first and second modulation orders to be zero.

6. The method of claim 4, further comprising the step of varying the amplitudes for the selected modulation orders.

* * * * *